(12) United States Patent
Huh et al.

(10) Patent No.: US 12,113,269 B2
(45) Date of Patent: Oct. 8, 2024

(54) ANTENNA DEVICE AND DISPLAY DEVICE INCLUDING THE SAME

(71) Applicant: DONGWOO FINE-CHEM CO., LTD., Jeollabuk-do (KR)

(72) Inventors: Yoon Ho Huh, Seoul (KR); Jong Min Kim, Gyeonggi-do (KR); Young Su Lee, Gyeonggi-do (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 137 days.

(21) Appl. No.: 17/875,641

(22) Filed: Jul. 28, 2022

(65) Prior Publication Data
US 2022/0368008 A1  Nov. 17, 2022

Related U.S. Application Data

(63) Continuation of application No. PCT/KR2020/013256, filed on Sep. 28, 2020.

(30) Foreign Application Priority Data

Jan. 30, 2020  (KR) .................. 10-2020-0010916

(51) Int. Cl.
*H01Q 1/24* (2006.01)
*G06F 1/16* (2006.01)
*H01Q 1/38* (2006.01)
*H01Q 1/48* (2006.01)

(52) U.S. Cl.
CPC ........... *H01Q 1/243* (2013.01); *G06F 1/1698* (2013.01); *H01Q 1/38* (2013.01); *H01Q 1/48* (2013.01)

(58) Field of Classification Search
CPC ............. H01Q 1/243; H01Q 1/38; H01Q 1/48
See application file for complete search history.

(56) References Cited

FOREIGN PATENT DOCUMENTS

| CN | 103259095 A | * | 8/2013 |
|---|---|---|---|
| EP | 0911906 A2 | * | 10/1998 |
| KR | 10-2013-0095451 A | | 8/2013 |
| KR | 10-2015-0104509 A | | 9/2015 |
| KR | 10-2016-0036436 A | | 4/2016 |
| KR | 10-2016-0080444 A | | 7/2016 |
| KR | 10-2016-0137315 A | | 11/2016 |
| KR | 10-2019-0019802 A | | 2/2019 |
| KR | 10-1973742 B1 | | 4/2019 |
| KR | 10-2019-0105812 A | | 9/2019 |
| KR | 10-2020-0005010 A | | 1/2020 |

OTHER PUBLICATIONS

Hautcoeur, J., Talbi, L., Hettak, K. and Nedil, M. (2014), 60 GHz optically transparent microstrip antenna made of meshed AuGL material. IET Microw. Antennas Propag., 8: 1091-1096. doi: 10.1049/iet-map.2013.0564 (Year: 2014).*

(Continued)

*Primary Examiner* — Dieu Hien T Duong
(74) *Attorney, Agent, or Firm* — The PL Law Group, PLLC

(57) ABSTRACT

An antenna device according to an embodiment may include a dielectric layer, a radiator and a transmission line which are disposed on an upper surface of the dielectric layer and formed in a mesh structure. A mesh line width of the transmission line may be thicker than a mesh line width of the radiator.

13 Claims, 5 Drawing Sheets

(56) References Cited

OTHER PUBLICATIONS

Office action issued on Jun. 29, 2023 from Korean Patent Office in a counterpart Korean Patent Application No. 10-2020-0010916 (all the cited references are listed in this IDS.) (English translation is also submitted herewith.).
International Search Report for PCT/KR2020/013256 mailed on Jan. 11, 2021.

\* cited by examiner

ANTENNA DEVICE AND DISPLAY DEVICE INCLUDING THE SAME

CROSS-REFERENCE TO RELATED APPLICATION AND CLAIM OF PRIORITY

The present application is a continuation of application to International Application No. PCT/KR2020/013256 with an International Filing Date of Sep. 28, 2020, which claims the benefit of Korean Patent Applications No. 10-2020-0010916 filed on Jan. 30, 2020 at the Korean Intellectual Property Office, the disclosures of which are incorporated by reference herein in their entirety.

BACKGROUND

1. Field

The present invention relates to an antenna device and a display device including the same.

2. Description of the Related Art

Recently, according to development of the information-oriented society, wireless communication techniques such as Wi-Fi, Bluetooth, and the like are implemented, for example, in a form of smartphones by combining with display devices. In this case, an antenna may be coupled to the display device to perform a communication function. Recently, with mobile communication techniques becoming more advanced, it is necessary for an antenna for performing communication in ultra-high frequency bands to be coupled to the display device. In addition, as thin, high-transparent, and high-resolution display devices such as a transparent display and a flexible display have been developed in recent years, the antenna also need to be developed to have improved transparency and flexibility.

As a screen of the display device becomes larger, it is a recent trend to decrease a space or area of a bezel part or light-shielding part. In this case, the space or area in which the antenna can be mounted is also limited, and thereby, a radiator included in the antenna to transmit and receive a signal may be overlapped with a display region of the display device. Accordingly, an image of the display device may be hidden by the radiator of the antenna, or the radiator may be viewed by a user, such that image quality may be deteriorated.

Therefore, an antenna design for implementing high frequency communication with a desired antenna gain in a limited space without being viewed by the user is required.

SUMMARY

It is an object of the present invention to provide an antenna device and a display device including the same.

To achieve the above object, the following technical solutions are adopted in the present invention.
1. An antenna device including: a dielectric layer; and a radiator and a transmission line which are disposed on an upper surface of the dielectric layer and formed in a mesh structure, wherein a mesh line width of the transmission line is thicker than a mesh line width of the radiator.
2. The antenna device according to above 1, wherein the mesh line width of the transmission line is smaller than a value obtained by multiplying the mesh line width of the radiator by 2.6.
3. The antenna device according to above 1, wherein the mesh line width of the transmission line is smaller than a value obtained by multiplying the mesh line width of the radiator by 2.2.
4. The antenna device according to above 1, wherein an area of the transmission line is a value or less obtained by multiplying a reference area by 0.1, wherein the reference area is calculated by multiplying a sum of a length of the radiator and a length of the transmission line by a width of the radiator.
5. The antenna device according to above 1, further including a ground layer disposed on a lower surface of the dielectric layer.
6. The antenna device according to above 1, further including a signal pad connected to an end of the transmission line.
7. The antenna device according to above 6, further including a ground pad disposed around the signal pad to be separated from the signal pad.
8. The antenna device according to above 7, wherein the signal pad or the ground pad has a solid structure.
9. The antenna device according to above 1, further including a dummy pattern disposed on an upper surface of the dielectric layer.
10. The antenna device according to above 9, wherein the dummy pattern is arranged around the radiator and the transmission line.
11. The antenna device according to above 9, wherein the dummy pattern is formed in a mesh structure.
12. The antenna device according to above 11, wherein the mesh line width of the dummy pattern is the same as the mesh line width of the radiator.
13. The antenna device according to above 9, wherein the dummy pattern is electrically separated from the radiator and the transmission line.
14. A display device including the antenna device according to above 1.

Since the transmission line occupies a very small area compared to an entire area including the radiator, even if the mesh line width of the transmission line is formed thick to a specific range, a problem entailed in electrode visibility does not occur. Accordingly, it is possible to improve the antenna gain by forming the mesh line width of the transmission line to be thicker than the mesh line width of the radiator.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Figure 1:
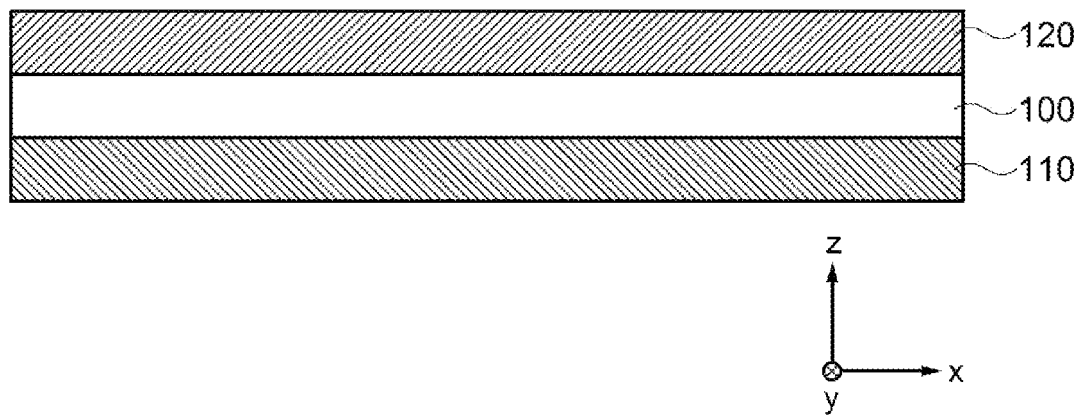
FIG. 1 is a schematic cross-sectional view illustrating an antenna device according to an embodiment.

Hereinafter, embodiments will be described in detail with reference to the accompanying drawings. In denoting reference numerals to constitutional elements of respective drawings, it should be noted that the same elements will be denoted by the same reference numerals although they are illustrated in different drawings.

In description of preferred embodiments of the present invention, the publicly known functions and configurations that are judged to be able to make the purport of the present invention unnecessarily obscure will not be described in detail. Further, wordings to be described below are defined in consideration of the functions of the present invention, and may differ depending on the intentions of a user or an operator or custom. Accordingly, such wordings should be defined on the basis of the contents of the overall specification.

It will be understood that, although the terms first, second, etc. may be used herein to describe various elements, components or sections, these elements, components or sections should not be limited by these terms. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Further, directional terms such as "one side," "the other side," "upper," "lower," and the like are used in connection with the orientation of the disclosed drawings. Since the components of the embodiments of the present invention may be located in various orientations, the directional terms are used for illustrative purposes, and are not intended to limit the present invention thereto.

In addition, a division of the configuration units in the present disclosure is intended for ease of description and divided only by the main function set for each configuration unit. That is, two or more of the configuration units to be described hereinafter may be combined into a single configuration unit or formed by two or more of divisions by function into more than a single configuration unit. Further, each of the configuration units to be described hereinafter may additionally perform a part or all of the functions among functions set for other configuration units other than being responsible for the main function, and a part of the functions among the main functions set for each of the configuration units may be exclusively taken and certainly performed by other configuration units An antenna device described in the present disclosure may be a patch antenna or a microstrip antenna manufactured in a form of a transparent film. The antenna device may be applied to, for example, a communication device for implementing high frequency or ultra-high frequency (e.g., 3G, 4G, 5G or higher) mobile communication, Wi-Fi, Bluetooth, NFC, GPS and the like.

In the drawings below, two directions which are parallel to an upper surface of a dielectric layer and cross perpendicular to each other are defined as an x direction and a y direction, and a direction perpendicular to the upper surface of the dielectric layer is defined as a z direction. For example, the x direction, they direction and the z direction may correspond to a width direction, a length direction and a thickness direction of the antenna device, respectively.

Figure 2:
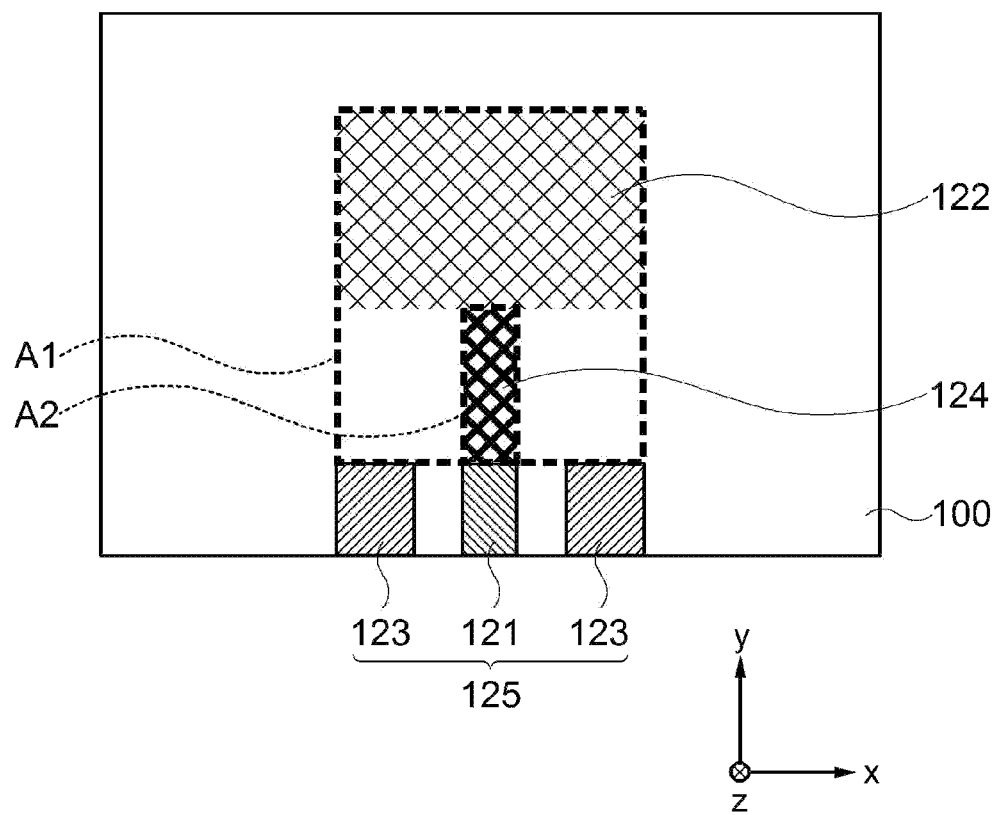
FIG. 2 is a schematic plan view illustrating the antenna device according to an embodiment.
Figure 3:
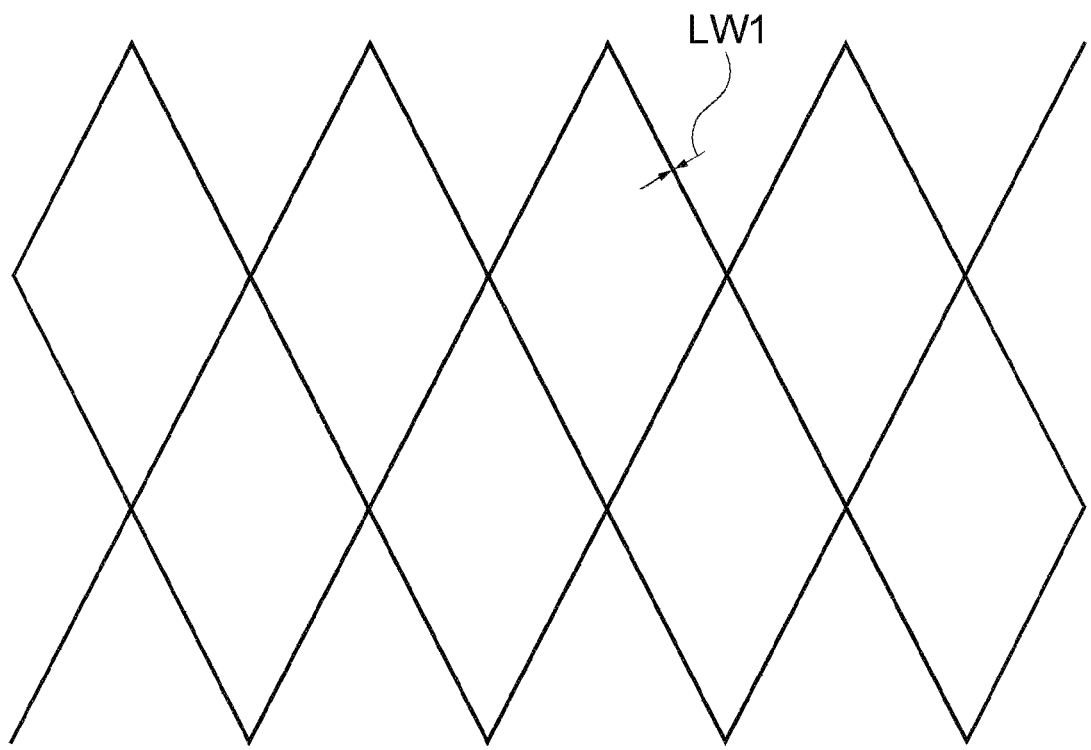
FIG. 3 is a diagram for describing a mesh line width of a radiator.
Figure 4:
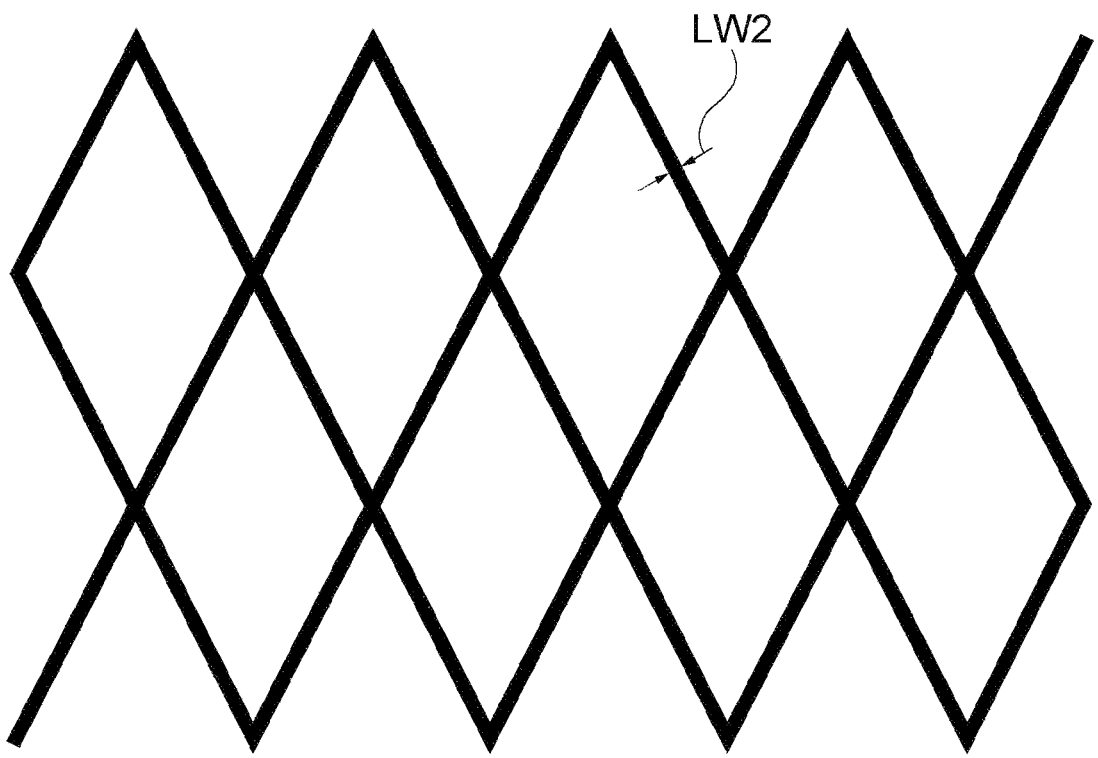
FIG. 4 is a diagram for describing a mesh line width of a transmission line.

FIG. 1 is a schematic cross-sectional view illustrating an antenna device according to an embodiment, FIG. 2 is a schematic plan view illustrating the antenna device according to an embodiment, FIG. 3 is a diagram for describing a mesh line width of a radiator, and FIG. 4 is a diagram for describing a mesh line width of a transmission line.

Referring to FIGS. 1 to 4, the antenna device may include a dielectric layer 100 and an antenna pattern layer 120.

The dielectric layer 100 may include an insulation material having a predetermined dielectric constant. According to an embodiment, the dielectric layer 100 may include an inorganic insulation material such as glass, silicon oxide, silicon nitride, or metal oxide, or an organic insulation material such as an epoxy resin, an acrylic resin, or an imide resin. The dielectric layer 100 may function as a film base material for an antenna device on which the antenna pattern layer 120 is formed.

According to an embodiment, a transparent film may be provided as the dielectric layer 100. At this time, the transparent film may include a polyester resin such as polyethylene terephthalate, polyethylene isophthalate, polyethylene naphthalate, polybutylene terephthalate, etc.; a cellulose resin such as diacetyl cellulose, triacetyl cellulose, etc.; a polycarbonate resin; an acryl resin such as polymethyl (meth)acrylate, polyethyl (meth)acrylate, etc.; a styrene resin such as polystyrene, acrylonitrile-styrene copolymer, etc.; a polyolefin resin such as polyethylene, polypropylene, cyclic polyolefin or polyolefin having a norbornene structure, ethylene-propylene copolymer, etc.; a vinyl chloride resin; an amide resin such as nylon, an aromatic polyamide, etc.; an imide resin; a polyether sulfonic resin; a sulfonic resin; a polyether ether ketone resin; a polyphenylene sulfide resin; a vinylalcohol resin; a vinylidene chloride resin; a vinylbutyral resin; an allylate resin; a polyoxymethylene resin; a thermoplastic resin such as an epoxy resin and the like. These compounds may be used alone or in combination of two or more thereof. In addition, a transparent film made of a thermosetting resin or an ultraviolet curable resin such as (meth)acrylate, urethane, acrylic urethane, epoxy, silicone, and the like may be used as the dielectric layer 100.

According to an embodiment, an adhesive film such as an optically clear adhesive (OCA) or an optically clear resin (OCR) may be included in the dielectric layer 100.

According to an embodiment, the dielectric layer 100 may be formed in a substantially single layer, or may be formed in a multilayer structure of at least two or more layers.

Capacitance or inductance is formed by the dielectric layer 100, such that a frequency band capable of driving or sensing the antenna device may be adjusted. When the dielectric constant of the dielectric layer 100 exceeds about 12, the driving frequency is excessively reduced, such that driving of the antenna in a desired high frequency band may not be implemented. Therefore, according to an embodiment, the dielectric constant of the dielectric layer 100 may be adjusted in a range of about 1.5 to 12, and preferably about 2 to 12.

According to an embodiment, an insulation layer (e.g., an encapsulation layer, a passivation layer, etc. of a display panel) inside the display device on which the antenna device is mounted may be provided as the dielectric layer 100.

The antenna pattern layer 120 may be disposed on an upper surface of the dielectric layer 100.

The antenna pattern layer 120 may include antenna patterns including a radiator 122 and a transmission line 124, and a pad electrode 125.

The antenna patterns 122 and 124 may include a low-resistance metal such as silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), tin (Sn), zinc (Zn), molybdenum (Mo), calcium (Ca), or alloys thereof. These metals may be used alone or in combination of two or more thereof. For example, the antenna patterns 122 and 124 may include silver (Ag) or a silver alloy (e.g., a silver-palladium-copper (APC) alloy) for implementation of a low resistance. As another example, the antenna patterns 122 and 124 may include copper (Cu) or a copper alloy (e.g., a copper-calcium (CuCa) alloy) in consideration of low resistance and fine line width patterning.

According to an embodiment, the antenna patterns 122 and 124 may include a transparent metal oxide such as indium tin oxide (ITO), indium zinc oxide (IZO), indium zinc tin oxide (IZTO), zinc oxide (ZnOx), copper oxide (CuO) or the like.

According to an embodiment, the antenna patterns 122 and 124 may include a lamination structure of a transparent conductive oxide layer and a metal layer, and for example, may have a double-layer structure of a transparent conductive oxide layer-metal layer or a three-layer structure of a transparent conductive oxide layer-metal layer-transparent conductive oxide layer. In this case, a signal transmission speed may be improved by reducing the resistance while enhancing the flexible property by the metal layer, and corrosion resistance and transparency may be improved by the transparent conductive oxide layer.

The radiator 122 may be formed in a mesh structure. Thereby, transmittance of the radiator 122 may be increased, and flexibility of the antenna device may be enhanced. Therefore, the antenna device may be effectively applied to a flexible display device.

According to an embodiment, the radiator 122 may be implemented in a rectangular shape, as shown in FIG. 2. However, it is only an example and there is no particular limitation in the shape of the radiator 122. That is, the radiator 122 may be implemented in various shapes such as a rhombus, circle or the like.

The transmission line 124 is disposed between the radiator 122 and a signal pad 121 of the pad electrode 125, and may electrically connect the radiator 122 and the signal pad 121.

The transmission line 124 may be branched from a central portion of the radiator 122 and then connected to the signal pad 121.

According to an embodiment, the transmission line 124 may include substantially the same conductive material as the radiator 122. In addition, the transmission line 124 may be integrally connected with the radiator 122 to be provided as a substantially single member, or may be provided as a member separate from the radiator 122.

The transmission line 124 may be formed in a mesh structure. At this time, as shown in FIGS. 3 and 4, a mesh line width LW2 of the transmission line 124 may be different from a mesh line width LW1 of the radiator 122.

Since the transmission line 124 is a portion that transmits a signal from the signal pad 121 of the pad electrode 125 to the radiator 122, electrical characteristics of the transmission line 124 are an important factor in a design of the antenna. However, since an area of the transmission line 124, which is one of factors that determine the electrical characteristics of the transmission line 124, is related to a resonance frequency and impedance of the antenna device, it is difficult to freely change the area. Herein, the area of the transmission line 124 may be an area A2 formed by an outline of the transmission line 124, as illustrated in FIG. 2. The area A2 of the transmission line 124 may be calculated by multiplying a length of the transmission line 124 by a width of the transmission line 124.

According to an embodiment, the area of the transmission line 124 may be determined within a range that satisfies Equation 1 below in consideration of an influence and impedance on the resonance frequency of the radiator 122.

$$0 < A2/A1 \leq 0.1$$ [Equation 1]

Wherein, A1 may be a region area calculated by multiplying a sum of a length of the radiator 122 and a length of the transmission line 124 by a width of the radiator 122, and A2 may be an area of the transmission line 124.

In addition, the area A2 of the transmission line 124 is a value or less obtained by multiplying a reference area by 0.1. Herein, the reference area is calculated by multiplying the sum of the length of the radiator 122 and the length of the transmission line 124 by the width of the radiator 122.

By adjusting the area of the transmission line 124, it is possible to improve the antenna gain. However, as described above, since the area of the transmission line 124 is related to the resonance frequency and impedance of the antenna device, it is difficult to freely change the area. Therefore, according to an embodiment, by adjusting the mesh line width LW2 of the transmission line 124, it is possible to improve the antenna gain.

According to an embodiment, an experimental example for a ratio of the mesh line width LW2 of the transmission line 124 to the mesh line width LW1 of the radiator 122, an antenna gain and visibility thereof are shown in Table 1 below.

TABLE 1

| | Line width | | | | |
| --- | --- | --- | --- | --- | --- |
| | LW1 (μm) | LW2 (μm) | LW3 (μm) | Gain (dBi) | Visibility |
| Comparative Example 1 | 2.5 | 2.0 | 0.8 | 2.6 | X |
| Comparative Example 2 | 2.5 | 2.5 | 1.0 | 3.3 | X |
| Example 3 | 2.5 | 3.0 | 1.2 | 3.7 | X |
| Example 4 | 2.5 | 3.5 | 1.4 | 4.0 | X |
| Example 5 | 2.5 | 4.0 | 1.6 | 4.2 | X |
| Example 6 | 2.5 | 4.5 | 1.8 | 4.4 | X |
| Example 7 | 2.5 | 5.0 | 2.0 | 4.6 | X |
| Example 8 | 2.5 | 5.5 | 2.2 | 4.7 | ○ |
| Example 9 | 2.5 | 6.0 | 2.4 | 4.8 | ○ |
| Example 10 | 2.5 | 6.5 | 2.6 | 4.9 | ◉ |
| Example 11 | 2.5 | 7.0 | 2.8 | 5.0 | ◉ |

* ◉: Strongly viewed,
○: Weakly viewed,
X: Not viewed

As shown in Table 1, it can be seen that when setting the mesh line width LW1 of the radiator 122 to 2.5 and increasing the mesh line width LW2 of the transmission line 124 from 2.0 μm to 7.0 μm in 0.5 μm unit, that is, increasing the ratio of the mesh line width LW2 of the transmission line 124 to the mesh line width LW1 of the radiator 122, the antenna gain is also increased. In addition, it can be seen that when the ratio of the mesh line width LW2 of the transmission line 124 to the mesh line width LW1 of the radiator 122 is a first level (2.2 in the example of Table 1) or more, the radiator 122 and/or the transmission line 124 begins to be weakly viewed, and when the ratio of the mesh line width LW2 of the transmission line 124 to the mesh line width LW1 of the radiator 122 exceeds a second level (2.6 in the example of Table 1), the radiator 122 and/or the transmission line 124 begins to be strongly viewed. Herein, the expression "not viewed" refers to a case in which a recognition rate of the radiator 122 and/or the transmission line 124 is less than a first threshold when visually observing, the expression "weakly viewed" refers to a case in which the recognition rate of the radiator 122 and/or the transmission line 124 is the first threshold or more and less than a second threshold when visually observing, and the expression "strongly viewed" refers to a case in which the recognition rate of the radiator 122 and/or the transmission line 124 is the second threshold or more when visually observing.

According to an embodiment, the ratio of the mesh line width LW2 of the transmission line 124 to the mesh line width LW1 of the radiator 122 may be determined in consideration of the antenna gain and visibility.

For example, in consideration of the antenna gain rather than the visibility, the ratio of the mesh line width LW2 of the transmission line 124 to the mesh line width LW1 of the radiator 122 may be determined within a range satisfying Equation 2 below.

$$1 < LW2/LW1 \qquad \text{[Equation 2]}$$

For another example, in consideration of both the visibility and antenna gain, the ratio of the mesh line width LW2 of the transmission line 124 to the mesh line width LW1 of the radiator 122 may be determined within a range satisfying Equation 3 below.

$$1 < LW2/LW1 < 2.6 \qquad \text{[Equation 3]}$$

It can be seen from Equation 3 that the mesh line width LW2 of the transmission line 124 is smaller than a value obtained by multiplying the mesh line width LW1 of the radiator 122 by 2.6.

For another example, in consideration of the visibility rather than the antenna gain, the ratio of the mesh line width LW2 of the transmission line 124 to the mesh line width LW1 of the radiator 122 may be determined within a range satisfying Equation 4 below.

$$1 < LW2/LW1 < 2.2 \qquad \text{[Equation 4]}$$

It can be seen from Equation 4 that the mesh line width LW2 of the transmission line 124 is smaller than a value obtained by multiplying the mesh line width LW1 of the radiator 122 by 2.2.

The pad electrode 125 may include the signal pad 121 and a ground pad 123.

The signal pad 121 may be connected to an end of the transmission line 124 and electrically connected with the radiator 122 through the transmission line 124. Thereby, the signal pad 121 may electrically connect a driving circuit unit (e.g., an IC chip, etc.) and the radiator 122. For example, a circuit board such as a flexible printed circuit board (FPCB) may be adhered to the signal pad 121, and a driving circuit unit may be mounted on the flexible printed circuit board. Accordingly, the radiator 122 and the driving circuit unit may be electrically connected with each other.

The ground pad 123 may be disposed around the signal pad 121 to be electrically and physically separated from the signal pad 121. For example, a pair of ground pads 123 may be disposed to face each other with the signal pad 121 interposed therebetween.

According to an embodiment, in order to reduce signal resistance, the signal pad 121 and the ground pad 123 may be formed in a solid structure including the above-described metals or alloys thereof. In this case, the signal pad 121 and the ground pad 123 may be formed in a multilayer structure including a layer of the above-described metals or alloys thereof and a transparent conductive oxide layer.

According to an embodiment, the antenna device may further include a ground layer 110. Since the antenna device includes the ground layer 110, vertical radiation characteristics may be implemented.

The ground layer 110 may be formed on a lower surface of the dielectric layer 100. The ground layer 110 may be disposed to be overlapped with the antenna pattern layer 120 as a whole in a planar direction.

According to an embodiment, a conductive member of a display device or a display panel, on which the antenna device is mounted, may be provided as the ground layer 110. For example, the conductive member may include electrodes or wirings such as a gate electrode, source/drain electrodes, pixel electrode, common electrode, data line, scan line, etc. of a thin film transistor (TFT) included in the display panel, steel use stainless (SUS) plate, heat radiation sheet, digitizer, electromagnetic shielding layer, pressure sensor, fingerprint sensor and the like.

Meanwhile, for the convenience of description, only one antenna pattern is shown in FIG. 2, but a plurality of antenna patterns may be arranged on the dielectric layer 100 in an array form.

As described above, by implementing the antenna patterns 122 and 124 in a mesh structure, it is possible to improve the transmittance of the antenna device. In addition, by forming a conductive line included in the mesh structure using a low-resistance metal such as copper, silver or an APC alloy, it is possible to suppress an increase in the resistance. Therefore, a transparent film antenna with low resistance and high sensitivity may be effectively implemented.

In addition, by forming the mesh line width of the transmission line 124 thicker than the mesh line width of the radiator 122, as well as adjusting the ratio of the mesh line width of the transmission line 124 to the mesh line width of the radiator 122 in consideration of electrode visibility, it is possible to improve antenna gain characteristics of the antenna device without a change in the area of the transmission line 124.

Figure 5:
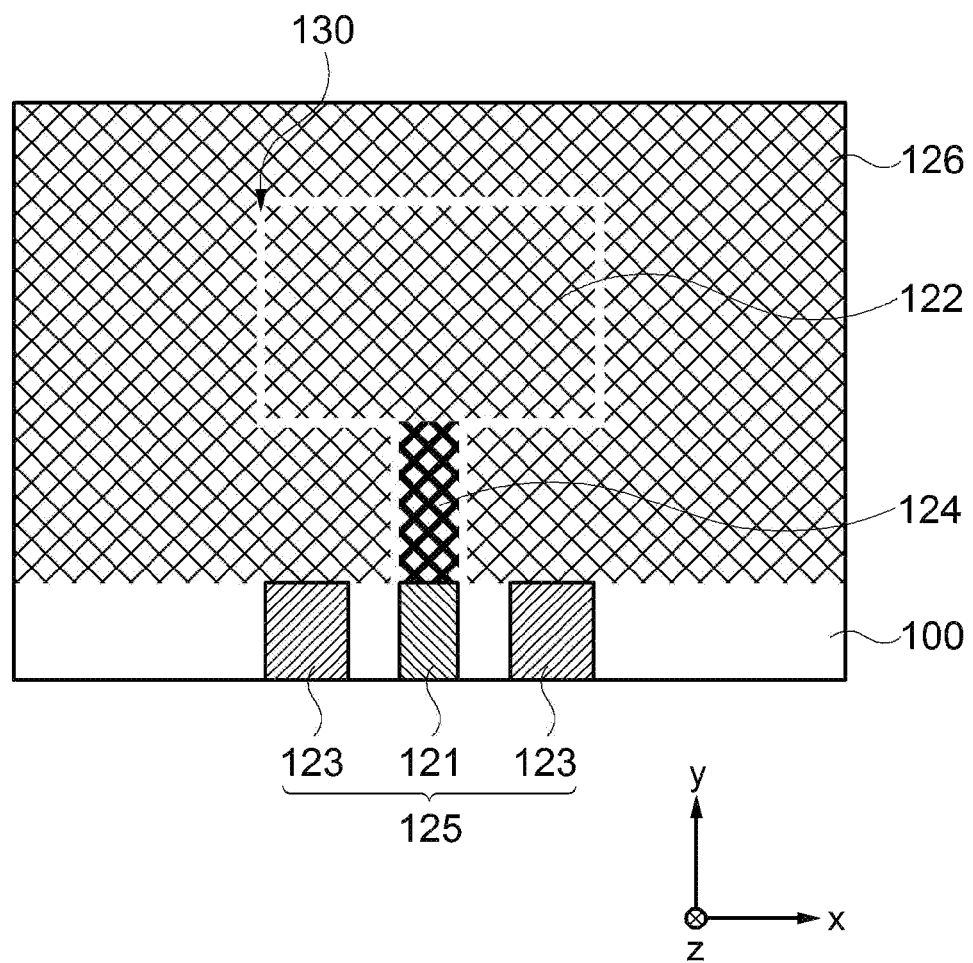
FIG. 5 is a schematic plan view illustrating an antenna device according to another embodiment.

FIG. 5 is a schematic plan view illustrating an antenna device according to another embodiment.

Referring to FIGS. 1 and 5, an antenna pattern layer 120 may include antenna patterns including a radiator 122 and a transmission line 124, a pad electrode 125, and a dummy pattern 126. Herein, the radiator 122, the transmission line 124 and the pad electrode 125 are the same as those described above with reference FIGS. 1 to 4, and therefore will not be described in detail.

The dummy pattern 126 may be arranged around the antenna patterns including the radiator 122 and the transmission line 124.

The dummy pattern 126 is formed in a mesh structure having substantially the same shape (e.g., the same line width, the same interval, etc.) as the radiator 122 or the transmission line 124, and may include the same metal as the radiator 122 and/or the transmission line 124. Preferably, the mesh line width of the dummy pattern 126 is the same as the mesh line width of the radiator 122. According to an embodiment, the dummy pattern 126 may be formed in a broken mesh structure in which some conductive lines are broken.

The dummy pattern 126 may be disposed to be electrically and physically separated from the antenna patterns 122 and 124 and the pad electrode 125. For example, a separation region 130 may be formed along side lines or profiles of the antenna patterns 122 and 124, thus to separate the dummy pattern 126 and the antenna patterns 122 and 124 from each other.

As described above, by arranging the dummy pattern 126 having the same mesh structure as the radiator 122 and/or the transmission line 124 around the antenna patterns 122 and 124, it is possible to prevent the antenna pattern of the display device on which the antenna device is mounted from being viewed by a user according to a difference in the electrode arrangement for each position.

Meanwhile, for the convenience of description, only one antenna pattern is shown in FIG. 5, but a plurality of antenna patterns may be arranged in an array form on the dielectric layer 100.

Figure 6:
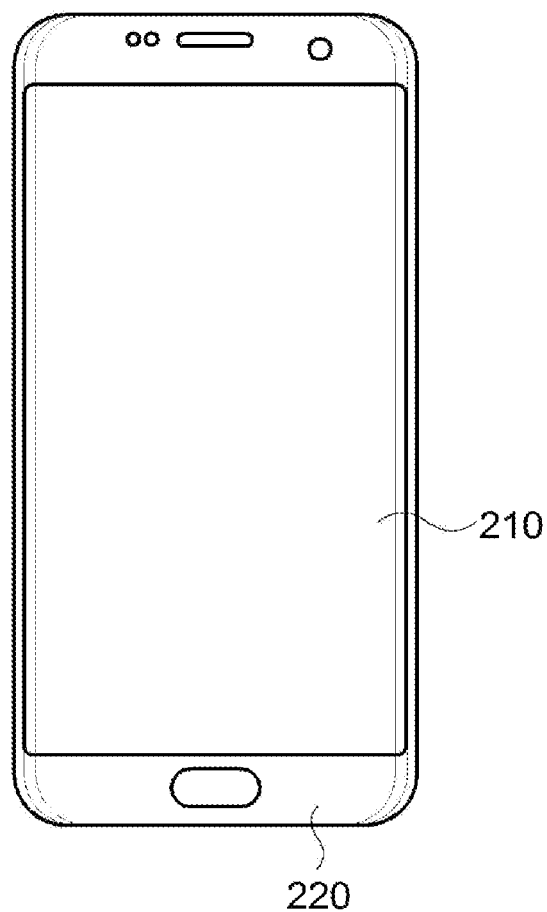
FIG. 6 is a schematic plan view illustrating a display device according to an embodiment.

FIG. 6 is a schematic plan view illustrating a display device according to an embodiment. More specifically, FIG. 6 is a view illustrating an external shape including a window of the display device.

Referring to FIG. 6, a display device 200 may include a display region 210 and a peripheral region 220. The peripheral region 220 may be disposed on both sides and/or both ends of the display region 210, for example.

According to an embodiment, the above-described antenna device may be inserted into the display device 200 in a form of a film or patch. For example, the radiator 122 and/or the transmission line 124 of the antenna device may be disposed to at least partially correspond to the display region 210 of the display device 200, and the pad electrode 125 may be disposed to correspond to the peripheral region 220 of the display device 200.

The peripheral region 220 may correspond to a light-shielding part or a bezel part of the display device 200, for example. In addition, a driving circuit such as an IC chip of the display device 200 and/or the antenna device may be disposed in the peripheral region 220.

By arranging the pad electrode 125 of the antenna device to be adjacent to the driving circuit, a signal transmission/reception path may be shortened, and thereby suppressing a signal loss.

When the antenna device includes the dummy pattern 126, the dummy pattern 126 may be disposed to at least partially correspond to the display region 210 of the display device 200.

Since the antenna device includes the antenna pattern and/or the dummy pattern formed in a mesh structure, transmittance may be improved and electrode visibility may be significantly reduced or suppressed. Accordingly, while maintaining or improving desired communication reliability, image quality in the display region 210 may also be improved.

The present invention has been described with reference to the preferred embodiments above, and it will be understood by those skilled in the art that various modifications may be made within the scope without departing from essential characteristics of the present invention. Accordingly, it should be interpreted that the scope of the present invention is not limited to the above-described embodiments, and other various embodiments within the scope equivalent to those described in the claims are included within the present invention.

What is claimed is:

1. An antenna device comprising:
   a dielectric layer; and
   a radiator and a transmission line which are disposed on an upper surface of the dielectric layer and formed in a mesh structure,
   wherein a mesh line width of the transmission line is thicker than a mesh line width of the radiator,
   wherein the mesh line width of the transmission line is from 3.0 μm to 7.0 μm, and the mesh line width of the transmission line is smaller than a value obtained by multiplying the mesh line width of the radiator by 2.6.

2. The antenna device according to claim 1, wherein the mesh line width of the transmission line is smaller than a value obtained by multiplying the mesh line width of the radiator by 2.2.

3. The antenna device according to claim 1, wherein an area of the transmission line is a value or less obtained by multiplying a reference area by 0.1,
   wherein the reference area is calculated by multiplying a sum of a length of the radiator and a length of the transmission line by a width of the radiator.

4. The antenna device according to claim 1, further comprising a ground layer disposed on a lower surface of the dielectric layer.

5. The antenna device according to claim 1, further comprising a signal pad connected to an end of the transmission line.

6. The antenna device according to claim 5, further comprising a ground pad disposed around the signal pad to be separated from the signal pad.

7. The antenna device according to claim 6, wherein the signal pad or the ground pad has a solid structure.

8. The antenna device according to claim 1, further comprising a dummy pattern disposed on an upper surface of the dielectric layer.

9. The antenna device according to claim 8, wherein the dummy pattern is arranged around the radiator and the transmission line.

10. The antenna device according to claim 8, wherein the dummy pattern is formed in a mesh structure.

11. The antenna device according to claim 10, wherein the mesh line width of the dummy pattern is the same as the mesh line width of the radiator.

12. The antenna device according to claim 8, wherein the dummy pattern is electrically separated from the radiator and the transmission line.

13. A display device comprising the antenna device according to claim 1.

* * * * *